United States Patent [19]

Kwok

[11] 4,412,245
[45] Oct. 25, 1983

[54] DIFFERENTIAL CURRENT DETECTOR IN CABLE TELEVISION TRUNK AMPLIFIER STATION

[75] Inventor: Sai W. Kwok, El Paso, Tex.

[73] Assignee: GTE Products Corporation, Stamford, Conn.

[21] Appl. No.: 193,315

[22] Filed: Oct. 1, 1980

[51] Int. Cl.³ .............................................. H04N 7/10
[52] U.S. Cl. ........................................ 358/86; 361/93; 455/9
[58] Field of Search ............... 455/9; 358/86; 361/90, 361/91, 92, 93, 87; 330/252, 261

[56] References Cited

U.S. PATENT DOCUMENTS

| | | | |
|---|---|---|---|
| 3,737,774 | 6/1973 | Verhagen | 455/9 |
| 3,973,185 | 8/1976 | Beak et al. | 361/87 |
| 4,241,373 | 12/1980 | Mara et al. | 361/92 |
| 4,278,930 | 7/1981 | Rogers | 361/93 |
| 4,331,996 | 5/1982 | Matsko et al. | 361/92 |

*Primary Examiner*—Joseph A. Orsino, Jr.
*Attorney, Agent, or Firm*—Russell A. Cannon

[57] ABSTRACT

A voltage comparator compares the DC current in active elements of a trunk amplifier with a variable reference voltage for detecting when to switch to a bypass mode. Its output is normally low for passing a current through it, an LED, and relay coils when the amplifier operates satisfactorily. Circuitry for establishing an allowable amount of decrease in DC current in a current sensing resistor R5, prior to switching the comparator for de-energizing the relay coils, comprises a first transistor Q4 that continuously conducts collector current through a load resistor, a second transistor Q2 that is only responsive to a low output voltage of the comparator for passing a prescribed current through the load resistor for decreasing the first transistor Q4 collector voltage a prescribed amount, and circuitry including voltage dividers for coupling a greater percentage of the change in Q4 collector voltage to the positive input of the comparator than to the negative input thereof which also senses the level of the DC current.

29 Claims, 3 Drawing Figures

DIFFERENTIAL CURRENT DETECTOR IN CABLE TELEVISION TRUNK AMPLIFIER STATION

This invention relates to electrical circuitry for detecting a change in a DC current of greater than a prescribed amount and more particularly to method and apparatus for monitoring the DC current in active elements in an amplification line of a trunk amplifier station in a cable television system for detecting malfunction of the active elements and causing switching of trunk signals from the amplification line to a bypass line of the trunk station.

A cable television system includes a plurality of spaced-apart trunk amplifier stations in a trunk cable for periodically increasing the level of television signals on the cable. It is desirable to continue to pass television signals on the trunk cable when active elements of circuits for amplification, filtering and AGC in the amplification line of a particular station malfunctions. In accordance with one aspect of this invention, this is accomplished by replacing a defective amplification path of a particular trunk station with a straight through or bypass line of the station when malfunction of active elements in the amplification line are detected. Various parameters of active elements in the station equipment may be monitored for sensing malfunction thereof. In accordance with another aspect of this invention, malfunction of active elements in a trunk station is determined by monitoring the magnitude of DC activation current in them. When this DC current falls below a prescribed minimum value, malfunction may be indicated and the bypass line connected in the trunk cable. Since characteristics such as the values of components may be different for equipment in different stations and may change over a period of time, detection circuitry in different stations may operate at different levels and the reference level of DC current for active elements in one trunk station may be different from that in another station. It is desirable therefore to be able to sense a decrease in DC current of a prescribed amount, from a variable reference level, for detecting malfunction of electrical circuits in a trunk station amplification path. It is also desirable to have trunk station circuitry that an operator can conveniently set up in the field.

In accordance with this invention, apparatus for detecting a differential change in DC current that exceeds a prescribed value comprises: a comparator having a pair of input terminals and an output terminal, the comparator producing a first output voltage when one input terminal voltage is greater than the other input terminal voltage and producing a second output voltage when the other input terminal voltage is greater than the one input terminal voltage; first means producing a signal voltage Vs related to the magnitude of the DC current; second means for coupling a representation of the signal voltage to an input terminal of the comparator, and for establishing a prescribed value of difference voltage between the comparator input terminals for a prescribed DC reference current from which a DC current change is to be measured; the prescribed value of difference voltage setting the amount that the representation of the signal voltage (which is related to the magnitude of the DC current) must change in order to cause the comparator to cease producing the first output voltage and produce the second output voltage and thereby indicate that the change in DC current has exceeded the prescribed limit.

This invention will be more fully understood from the following detailed description of preferred embodiments thereof, together with the drawings in which.

Figure 1:
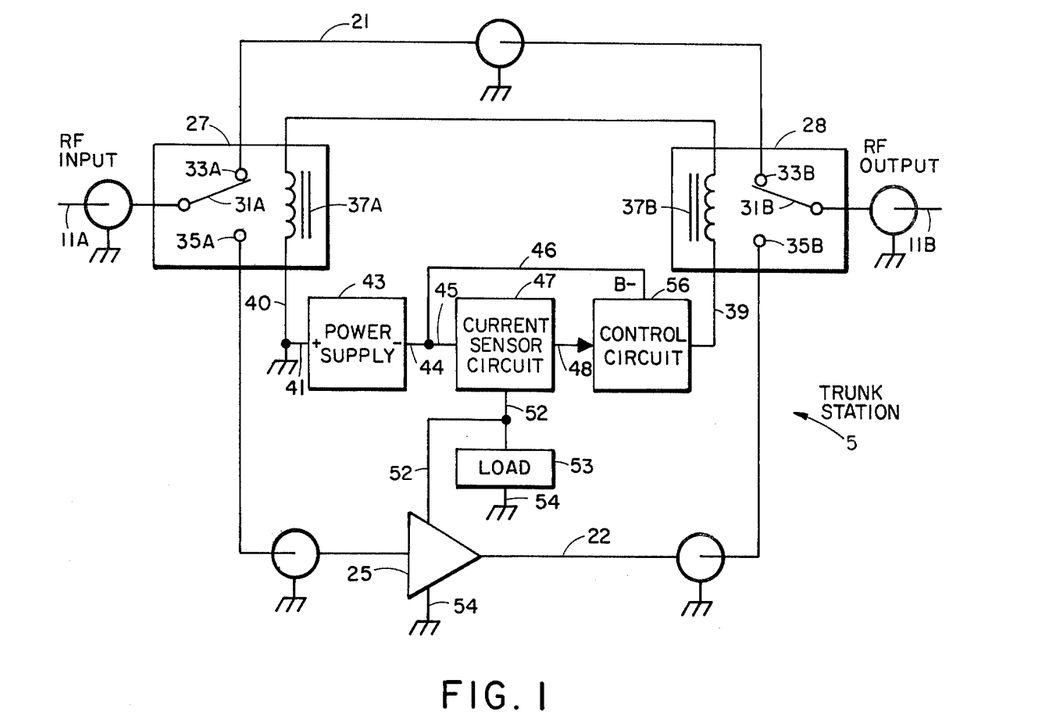
FIG. 1 is a schematic block diagram of electrical circuitry in a trunk amplifier station embodying this invention.

Referring now to FIG. 1, a trunk amplifier station 5 in a television system is electrically connected in series with line sections 11A and 11B of a trunk cable or line 11 that may be a coaxial transmission line carrying RF television signals from head-end equipment to a subscriber's television receiver (not shown). The trunk station 5 comprises a first length of coaxial transmission line 21 that is a bypass line, a second length of coaxial transmission line 22 having amplification means 25 in it, relay circuits 27 and 28 at opposite ends of the lines 21 and 22 for selectively connecting them in series in the trunk cable, a circuit 47 for sensing the magnitude of DC current from a power supply 43 that is passed through a load 53, and a control circuit 56 for monitoring the magnitude of the DC current and controlling the operation of the relay circuits, all of which are located in an enclosure (not shown) that is connected to a ground reference potential and which may operate as a ground plane for components of the trunk station. The line 21 may be a length of RG 59 coaxial transmission line that is selected for its low dielectric constant, which causes electromagnetic waves in it to have a high velocity of propagation.

The amplification means 25 in line 22 is representative and may comprise amplifiers, active filters, and automatic gain control circuits, all of which include active elements having DC activation current passed thereby. The lines 54 and 52 on amplification means 25 represent the DC power terminals which are directly connected to the positive terminal 41 on the power supply 43, and through the sensor circuit 47 to the negative terminal 44 of the power supply, respectively. The amplifier 25 is operative for amplifying RF television signals in a prescribed passband such as 50–300 MHz that are transmitted on trunk cable 11 in the forward direction that is from left to right in FIG. 1. The station may also include second amplifier means (not shown) providing amplification of signals that are transmitted in another passband and in the reverse direction on the trunk cable, i.e., from right to left in FIG. 1. Such a station terminal would provide two-way communication on the trunk cable.

Figure 2:
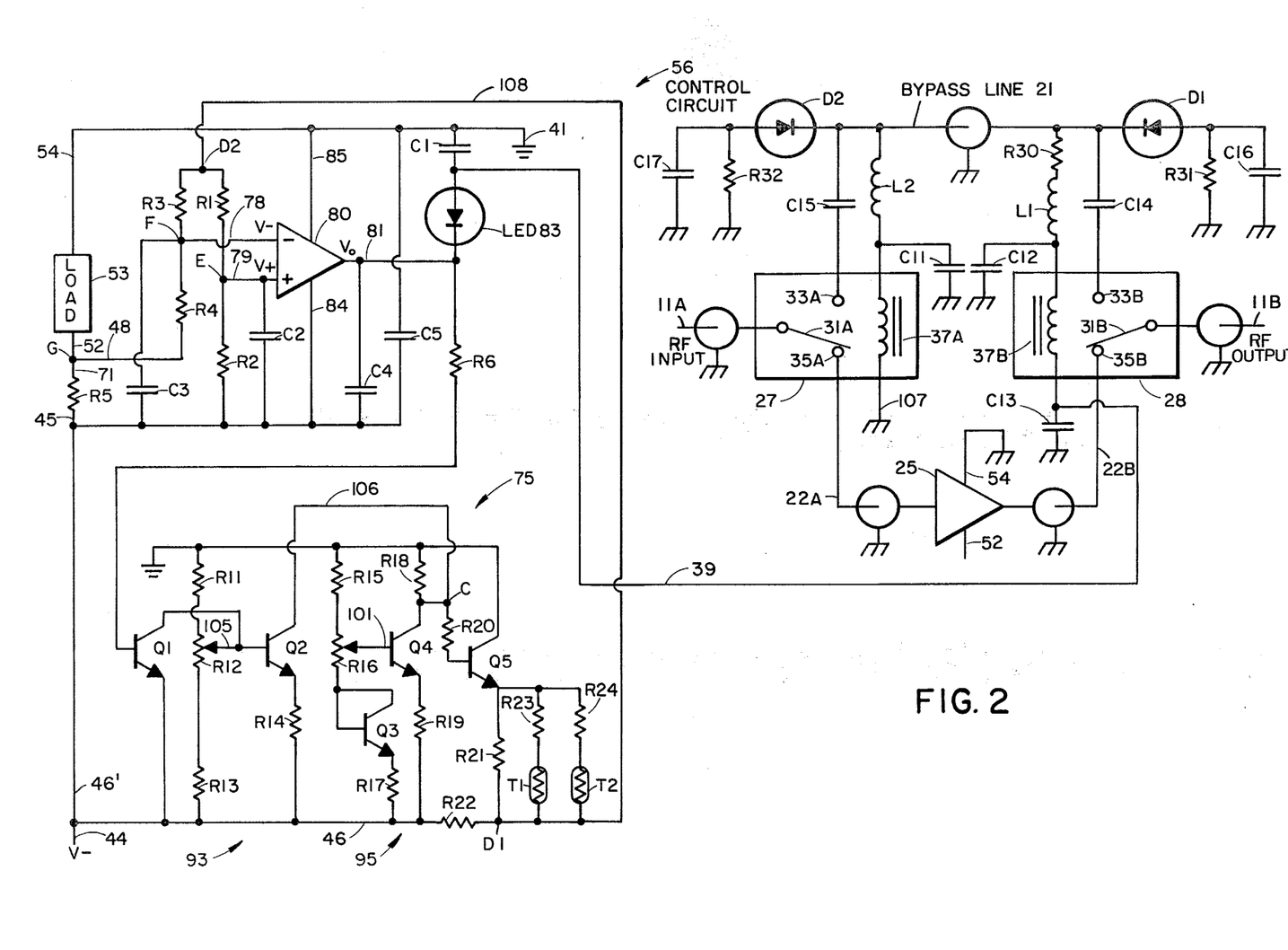
FIG. 2 is a schematic circuit diagram of the station equipment in FIG. 1.

The relay circuits 27 and 28 are shown in schematic form in FIGS. 1 and 2. They are identical, with elements of circuits 27 and 28 being identified by the same reference numerals and the subscripts A and B, respectively. The relay circuit 27, for example, is a relay of the break before make type having first, second and third form-C type reed contacts 31A, 33A and 35A and an excitation coil 37A. The reeds are actually thin elongated elements that are parallel to each other as is well known in the art. The relays are shown in FIG. 1 in the normal or de-energized state for connecting the bypass line 21 in the trunk cable. The relay circuits are shown in FIG. 2 in the energized state for connecting the amplification line 22 in the trunk cable. The series combination of the two relay coils 37 and the control circuit 56 are connected across the terminals of the power supply. The moveable reeds 31 are connected to the associated contact 35 when energization current from the power supply is passed through the relay coils. The moveable reed moves back into contact with the upper reed in FIG. 1 when the energization current is interrupted.

In a preferred embodiment of this invention, the relay circuit 27 comprises a combination relay and trapping filter structure for improving the isolation in the trunk station, the structure being described in co-pending patent application "RF Trap for a Cable Television Trunk Amplifier Station" by S. W. Kwok, Ser. No. 193,311, filed Oct. 1, 1980 and assigned to the assignee of this invention. The three reeds of each relay there are substantially parallel to each other, with a copper foil sleeve extending over the lengths of the reeds and mounted over a ground plane so that the reeds and sleeve operate as lengths of coupled transmission lines. Lengths of inductive wire connect opposite edges of the sleeve to associated variable capacitors which are connected to ground. The capacitors are tuned to make this structure operate as a high frequency trap for improving the isolation in the trunk station.

The trunk station 5 normally operates in the amplification mode with the DC current in amplifier 25 being passed by circuit 47 which produces a signal voltage on line 48 that is proportional thereto. Since the signal voltage is normally within prescribed limits, the control circuit 56 passes energization current on line 39 through the relay coils for inducing a field that maintains the moveable reeds 31 touching associated fixed reeds 35 (see FIG. 2) so that amplification line 22 is connected in series with the sections 11A and 11B of the trunk cable. When a decrease in the DC-current in amplifier means 25 exceeds a prescribed value, control circuit 56 interrupts the energization current in line 39 and the relay coils. This allows the moveable reeds 31 to return to their de-energized position, in contact with associated fixed reeds 33, which connects the bypass line 21 in series with the trunk cable sections 11A and 11B for maintaining transmission of television signals on the trunk cable.

Referring now to the more detailed representation of the trunk station in FIG. 2, the current sensor circuit 47 comprises a current sensing resistor R5 having one side thereof connected on line 45 to the negative supply voltage and its other side 71 connected on line 52 to load 53 (which includes the DC circuit of amplifier 25) which is connected through line 54 to the positive supply voltage (ground). The control circuit 56 comprises a voltage comparator 80 and a feedback circuit 75 that is responsive to the output signal Vo of the comparator on line 81 for producing a control voltage of a first or second value at node C and coupling representations of the control voltage that are of different values to the positive and negative input terminals of the comparator. The output voltage of the comparator is low and high when input voltages thereto are $V- > V+$ and $V- < V+$, respectively. The comparator may, by way of example, be a voltage comparator comprising operational amplifiers. The output impedance of the voltage comparator is such that when its output voltage is high and low, the output line 81 is essentially electrically connected through the comparator output circuit to ground and to the negative supply voltage, respectively.

The output terminal 81 of the comparator is electrically connected through an indicating device which is a light emitting diode (LED) 83, relay coil 37B, RF choke L1, current limiting resistor R30, the center conductor of bypass line 21, a second RF choke L2, and the other relay coil 37A to the ground side of the power supply. The RF chokes L1 and L2 block any RF television signals from the relay coils when the trunk station operates in the bypass mode. Bypass capacitors C11, C12 and C13 are electrically connected to sides of the relay coils for passing any television signals there to ground. Blocking capacitors C14 and C15 capacitively couple opposite ends of the center conductor of bypass line 21 to associated fixed reeds 33B and 33A for blocking DC energization current in the relay coils from the relay contacts. Opposite ends of the bypass line 21 are also short circuited to ground by current limiting resistors R31 and R32 and associated PIN diodes D1 and D2 which conduct when the trunk station operates in the amplification mode for improving its isolation. RF bypass capacitors C16 and C17 are connected across the current limiting resistors R31 and R32. The LED 83 is illuminated when the output of the comparator is low for passing an energization current through the relay coil 37A, bypass line 21, relay coil 37B, line 39, the LED, output line 81 and the output circuit line 84 of the comparator to the negative terminal 44 of the power supply.

The feedback circuit 75 comprises a switching transistor Q1, a constant current source 93 including a transistor Q2, a DC amplifier 95 including a transistor Q4 that continuously passes primary conduction current through a collector load resistor R18 for producing a control voltage on node C, and means for coupling representations of the control voltage that are of different values to the negative and positive input lines 78 and 79 of the comparator. The emitter and collector electrodes of Q4 are resistively connected to opposite sides of the power supply. A DC bias circuit R15-R16-R17 is connected across the power supply with the arm 101 of potentiometer R16 connected to the base of Q4 for causing it to continuously pass primary conduction current through collector resistor R18. The setting of potentiometer R16 establishes a fixed DC bias voltage on the Q4 base electrode that sets the magnitude of the Q4 emitter voltage and thus the Q4 collector current passed through load resistor 18. This sets the Q4 collector voltage and value of control voltage on node C when Q2 is non-conducting.

The emitter of Q2 is resistively connected to the negative supply voltage, whereas the Q2 collector is directly electrically connected to node C and the Q4 collector. The constant current source 93 also includes a DC bias circuit R11-R12-R13 that is electrically connected across the power supply, with the arm 105 of potentiometer R12 electrically connected to the Q2 base for setting the magnitude of a constant Q2 collector current that is selectively passed on line 106 through the Q4 collector resistor R18 for selectively decreasing the value of the control voltage Vc by a prescribed amount. This decrease in control voltage is determined by the Q2 collector current. Since the level of current detection provided by control circuit 56 is directly related to the magnitude of Q2 collector current, as is described more fully hereinafter, the setting of potentiometer R12 is normally a factory adjustment that establishes a prescribed Q2 emitter voltage and a Q2 collector current related to detection of a change in DC current in R5 of a prescribed magnitude such as 100 milliamperes.

The emitter and collector electrodes of the switching transistor Q1 are directly electrically connected to the negative side of the power supply and to the Q2 base, respectively. The Q1 base is electrically connected through current limiting resistor R6 to the output line 81 of the comparator for causing Q1 to control the operation of Q2 and thus the magnitude of control voltage on node C. When Q1 conducts, Q2 is cut off so that the Q4 collector and control voltages are high, and vice versa.

The circuitry for coupling representations of the control voltage to input terminals of the comparator comprises a buffer amplifier transistor Q5 which is responsive to the control voltage for continuously passing primary conduction current through series connected resistors R21 and R22, with a node D1 therebetween that is directly electrically connected to node D2. The resistances in the feedback circuit 75 are selected so that the representation of the control voltage at the nodes D will not overdrive the comparator. First and second series paths including a resistor and thermistor such as R23 and T1 are connected in shunt with R21 to compensate for variation of about 10% which may occur in the load current. A diode connected transistor Q3 is also connected in the DC bias circuit R15-R17 for temperature compensating thermal variations in the Q4 base-emitter diode.

Figure 3:
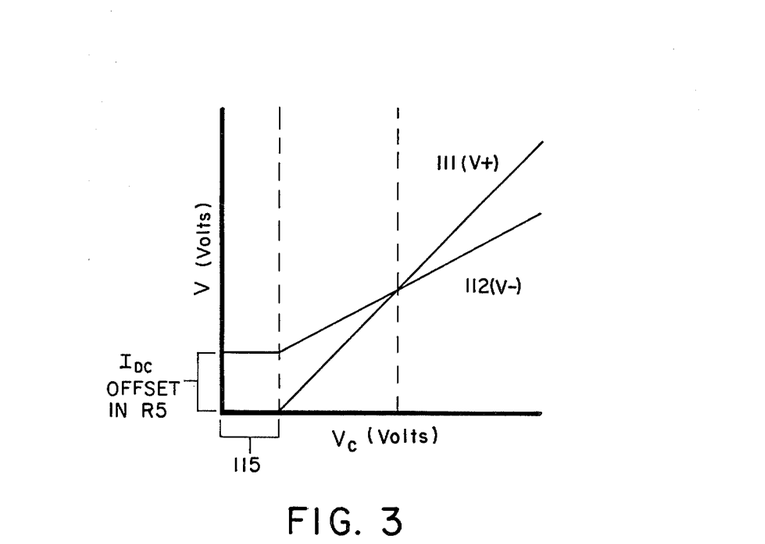
FIG. 3 is a plot of the comparator input voltages as a function of the control voltage Vc.

A first voltage divider R1-R2 is electrically connected between node D2 and the negative supply voltage, withits tap E connected to the positive input terminal of the comparator. A second voltage divider R3-R4-R5 is connected between node D2 and the negative supply voltage, with its tap F connected to the negative input terminal of the comparator. These voltage dividers are designed to produce a larger change in the node E voltage than the node F voltage, for a given change in control voltage at node C. Stated differently, the resistances in these voltage dividers are selected to make V+ decrease faster than V− when the control voltage decreases. Further consideration of the comparator input voltages V+ and V− as a function of the resistances of these voltage dividers, a fixed DC current in R5, and the control voltage at D2 reveals that V+ and V− vary linearly as a function of the representation of the control voltage at node D2 (see FIG. 3). The slope of V+ is R2/(R1+R2), whereas the slope of V− is (R4+R5)/(R3+R4+R5), with an offset for the straight line V− being established by a fixed DC reference current and a net resistance R3R5/(R3+R4+R5). The offset 115 for V+ is caused by the Q5 base-emitter junction voltage. The slope of the plot or graph 111 of V+ as a function of the voltage at node D2 is, of course, greater than the slope of the plot 112 of V− for this circuit. These plots for V− and V+ intersect for a value of control voltage and DC reference current in R5 which is readily determinable.

An RF bypass capacitor C1 is electrically connected between the anode of the LED and ground for isolating any AC signal variations associated with RF television signals on lines 21 or 22 from the feedback circuit 75. Similarly, bypass capacitors C2, C3 and C4 are connected between the negative supply voltage and the positive input, the negative input, and the output terminals of the comparator for isolating AC signal variations from Q1 and terminals of the comparator. A smoothing capacitor C5 is connected across the terminals of the power supply for a similar reason.

Briefly considering the operation of the station terminal in FIG. 2 when the voltage V+ at node E is greater than that at node F (i.e., V− <V+), the output voltage of the comparator is high and at approximately ground potential. Since the side 107 of the relay coil 37A is also connected to ground, there is no energization current in the relay coils and the station equipment operates in the bypass mode with the moveable reeds 31 being electrically connected to the bypass line 21 (see FIG. 1). In this instance, the positive output voltage on line 81 turns on Q1 which clamps the Q2 base electrode to approximately the negative supply voltage. This cuts Q2 off so that there is no Q2 collector current in R18. This means that the control voltage at the Q4 collector is determined solely by the Q4 collector current and is greater than what it may be when Q3 is conducting. Representations of this control voltage are coupled to the nodes E and F for establishing the input voltages on the comparator. The DC current in R5 also produces an offset voltage that is coupled to node F and the negative input of the comparator.

When the voltage V+ at node E is less than that at node F (i.e., V− >V+), then the output voltage of the comparator is approximately equal to the negative supply voltage for passing an energization current through the relay coils, LED, output circuit line 84 of the comparator, and the power supply. This illuminates the LED and causes the moveable reeds to connect the amplification line 22 in the trunk cable. With V− greater than V+, the negative voltage on line 81 holds Q1 cut off so that the Q2 base voltage is determined by R12. The resultant DC bias voltage on the Q2 base causes Q2 to conduct a fixed amount of collector current through R18 which decreases the Q4 collector voltage (and the control voltage at node C) by the prescribed amount, representations thereof being coupled to the inputs of the comparator.

After a trunk station is connected in a trunk cable 11 and circuitry of the station connected to the power supply by closing a switch (not shown) in line 44, for example, it is necessary to establish initial operation of the trunk station circuitry for the resultant-cumulative DC activation current passed by active elements comprising the load 53, and which is a DC reference current. This reference current in R5 produces the offset voltage at node F. This setup of the station equipment is readily accomplished by observing the LED, which is off when the trunk station operates in the bypass mode (V− <V+) and is illuminated when the trunk station operates in the amplification mode (V− >V+). If trunk station circuitry is initially operating with the LED off, then the comparator output voltage is high. This means that Q2 is cut off and the control voltage is established solely by the Q4 primary conduction current in R18 and is more positive than it would be if Q2 were conducting. Initial setup of the trunk station circuitry is then accomplished by adjusting potentiometer R16 so as to increase the Q4 base emitter voltage (which increases the Q4 collector current and therefore decreases the Q4 collector voltage) only sufficiently to turn the LED on. This occurs when the comparator input voltage V− is slightly greater than V+. Since the comparator output voltage Vo is now low, Q1 will be cut off to enable Q2 to conduct a fixed collector current in R18 which then decreases the control voltage by a prescribed amount. This voltage change is coupled to node D2. The resistances in the voltage dividers R3-R-4-R5 and R1-R2 are chosen to produce a reduction in the node E voltage that is greater than the reduction in the node F voltage. The difference between the resultant voltages on nodes E and F, immediately following conduction of Q2, is directly proportional to the amount of current detection produced by the control circuit. More specifically, the resultant difference voltage is directly proportional to the amount that the DC current in R5 must change before this change exceeds a prescribed limit and causes the comparator to change operating states. This completes the initial setup of the trunk station circuitry, the control circuit now operating with the comparator input voltage V− being greater than the input voltage V+ by a prescribed amount. If the trunk station is initially operating with the LED illuminated, R16 is adjusted to decrease the Q4 base emitter voltage and increase the Q4 collector voltage for increasing the control voltage sufficiently to make the LED turn off. Initial setup of the trunk station circuitry is then accomplished as is described above.

If an active element of the trunk station fails in a manner that causes the DC current in it and R5 to decrease, the voltages at nodes G and F also decrease. When the DC current decreases sufficiently to cause the node F voltage to be less than the node E voltage (V− < V+), the comparator changes operating states and its output voltage goes high. This shuts off the LED for indicating malfunction of an active element of trunk station circuitry and interrupts the energization current in the relay coils for returning the moveable reeds to their normal position which connects the bypass line 21 in the trunk cable for continuing the passage of television signals through the trunk station. Additionally, the high output voltage of the comparator closes the switch Q1 for cutting off Q2 and increasing the Q4 collector voltage (and thus the node E voltage more than the node F voltage) for maintaining the trunk station operating in the bypass mode.

In an embodiment of this invention that was built and operated satisfactorily, the voltage comparator was a Fairchild μA111. The resistances in the voltage dividers of the comparator input circuit were R1=12.1KΩ, R2=15KΩ, R3=13.7KΩ, R4=15KΩ, and R5=0.5Ω. The DC reference current in R5 was nominally 730 miliamperes. In an application where the control circuit was adjusted to detect a decrease in $I_{DC}$ in R5 of 100 mA, the Q2 emitter voltage was approximately 1.45 volts when Q2 was allowed to conduct. The control voltages at node C were 12.1 volts and 10.7 volts when Q2 was cut off and conducting, respectively, for an $I_{DC}$ of 730 miliamperes.

Although this invention is described in relation to preferred embodiments thereof, variations and modifications will occur to those skilled in the art. By way of example, the comparator output voltage may be coupled to the base of a power switching transistor for controlling passage of primary conduction current therethrough which is the energization current for the relay coils and the LED. Further, the control circuit 56 for sensing a differential decrease in DC current in active elements may be operated in conjunction with circuitry sensing other operating parameters of active elements in the trunk station for controlling operation thereof in an amplifiction or bypass mode. Additionally, the constant current source transistor Q2 and DC amplifier transistor Q4 may pass primary conduction current through separate load resistors for producing associated control voltages that are connected to transistor switches which control application of one or the other of the control voltages to a node D. Also, Q2 and Q4 may conduct through a common load resistor in the Q4 emitter circuit with the control voltage being coupled from either the emitter or collector circuit of Q4. Alternatively, Q2 may be a PNP transistor with the collector thereof connected through a resistor such as R17 in the Q4 base circuit to the negative supply voltage. This causes conduction of Q2 to control the Q4 base-emitter voltage and thus the magnitude of control voltage. Also, apparatus embodying this invention is useful for detecting increases in load current in R5 which exceed a prescribed value. This is accomplished with the trunk station circuitry in FIG. 2 by connecting the side 107 of relay coil 37A to the negative supply potential instead of ground, connecting the common sides of R31 and R32 to the negative supply voltage instead of ground, and reversing the connection of diodes D1 and D2. An output voltage of the comparator that is high then causes an energization current to be passed through the relay coils and the LED for energizing the coils and connecting the amplification line in the trunk cable and illuminating the LED for indicating such operation. Alternatively, the trunk station circuitry in FIG. 2 may be modified for detecting an increase in the DC current in R5 of greater than a prescribed magnitude by disconnecting nodes E and F from lines 79 and 78 and connecting them to lines 78 and 79, respectively. The scope of this invention is therefore to be determined from the appended claims rather than from the aforementioned detailed descriptions.

What is claimed is:

1. Apparatus for detecting a differential decrease in a DC current that exceeds a prescribed value, comprising:

comparator means having first and second input terminals and an output terminal, said comparator means producing a first output voltage when the input voltage at said first terminal is greater than that on said second terminal and producing a second output voltage when the input voltage at said second terminal is greater than that at said first terminal,     first means producing a signal voltage Vs proportional to the magnitude of the DC current,     second means operative for producing a control voltage,     third means responsive only to a first output voltage for decreasing the magnitude of the control voltage a prescribed amount from what it is when said comparator means produces a second output voltage,     fourth means coupling a representation of the signal voltage to said first input terminal of said comparator means, and coupling a representation of the control voltage to said comparator means second input terminal that changes more rapidly than a representation thereof that it couples to said comparator means first input terminal for a given change in control voltage,     the difference between said comparator means input terminal voltages being a prescribed value when the control voltage is the reduced value, immediately following prior establishment of a control voltage that is just sufficient for making said comparator means change operating states in a manner that makes the output thereof change from the second to the first output voltage, for a prescribed DC reference current from which a change in current is to be measured, the prescribed value of difference voltage being a function of the magnitude of decrease in DC current that is to be detected.

2. Apparatus according to claim 1 wherein said second means produces a variable control voltage at a first node, said apparatus being initially adjusted for operation with respect to a DC current of the reference level by increasing the control voltage sufficiently to make said comparator means produce the second output voltage and then gradually decreasing the control voltage only sufficiently to make said comparator means change operating states so that the output thereof is the first output voltage, said third means being responsive to said comparator means first output voltage for further decreasing the magnitude of the control voltage a prescribed amount which produces decreases in the voltages on said comparator means input terminals of different values that establish the prescribed value of difference voltage there and the level of current detection.

3. Apparatus according to claim 2 wherein said second means comprises first transistor means having emitter and collector electrodes electrically connected across a power supply and conducting primary conduction current through a first resistor means for producing the control voltage on one of the emitter and collector electrodes thereof; and said third means comprises second transistor means responsive only to a first output voltage for conducting primary conduction current through a second resistor means, which may be different from said first resistor means, for producing a voltage across the latter which effects the value of the control voltage, said second transistor means being cut off by a second output voltage of said comparator means.

4. Apparatus according to claim 3 wherein said first and second resistor means are the same-common resistor means and said first and second transistor means are operative for conducting primary conduction current through said common resistor means.

5. Apparatus according to claim 4 wherein the control voltage is coupled from the collector electrode of said first transistor means.

6. Apparatus according to claim 5 wherein said common resistor means is in the collector circuit of said first transistor means.

7. Apparatus according to claim 6 comprising fifth means responsive to the operation of said comparator means for providing a first indication and a second indication when said comparator means produces the first and second output voltages for indicating that the first input terminal voltage is greater than the second input terminal voltage and vice versa; the apparatus being initially adjustable for operating with respect to a DC current of a reference level by increasing the magnitude of control voltage sufficiently to make said fifth means produce a second indication and then gradually decreasing the magnitude of the control voltage only sufficiently to make said fifth means provide a first indication.

8. Apparatus according to claim 7 wherein said first means comprises a current sensing resistor having one side thereof electrically connected to one side of said power supply and passing the DC current therethrough; and fourth means further comprising: a first resistive voltage divider electrically connected between said other side of said current sensing resistor and a second node, said first voltage divider means having a tap electrically connected to said first input terminal of said comparator means; a second resistive voltage divider electrically connected between said one side of said voltage source and said second node, and having a tap electrically connected to said second input terminal of said comparator means; and sixth means electrically connecting said first node to said second node; the magnitude of resistances in said first and second voltage dividers and of said current sensing resistor being selected for establishing the percent of the magnitude of the control voltage that is coupled to the associated input terminal of said comparator means.

9. Apparatus according to claim 8 wherein said fifth means is a light emitting means, the first and second indications corresponding to said light emitting means being illuminated and shut off, respectively.

10. Apparatus monitoring the DC current in active elements in the amplification line of cable television trunk station equipment that also includes a bypass line and relays at opposite ends thereof with coils that normally pass a current which energizes them for connecting one of the amplification and bypass lines in series in a trunk cable, and operative for interrupting the energization current for de-energizing the coils so as to disconnect the one line from and insert the other line in the trunk cable when the differential decrease in monitored DC current exceeds a prescribed level, said apparatus comprising:

comparator means having first and second input terminals and an output terminal, said comparator means producing a first output voltage when the first terminal voltage is greater than the second terminal voltage, and producing a second output voltage when the second terminal voltage is greater than the first terminal voltage, first means producing a signal voltage Vs related to the magnitude of the DC current, a power supply, second means operative for producing a control voltage, comprising first transistor means biased for continuously conducting primary conduction current and having emitter and collector electrodes, with one of its emitter and collector electrodes connected through a resistor means to one side of said power supply and the other of its emitter and collector electrodes electrically connected to the other side of said power supply for producing the control voltage at a first node associated with the collector electrode thereof, third means responsive only to a first output voltage for decreasing the value of the control voltage a prescribed amount from what it is when said comparator means produces a second output voltage, comprising second transistor means having an emitter electrode and a collector electrode electrically connected to opposite sides of said power supply, with one of said emitter and collector electrodes being electrically connected through said resistor means to a side of said power supply, conduction of said second transistor means passing a fixed value of current through said resistor means for decreasing the magnitude of the collector voltage on said first transistor means and thus the control voltage, fourth means coupling a representation of the signal voltage to said first input terminal of said comparator means and coupling a representation of the control voltage to said comparator means second input terminal that is greater than the representation thereof that it couples to said comparator means first input terminal, the difference between the comparator means input terminal voltages being a prescribed value when the control voltage is the reduced value immediately following establishment of a control voltage that is just sufficient for making said comparator means change operating states for producing the first output voltage, for a prescribed DC reference current from which a change in DC current is to be measured, the prescribed value of difference voltage being related to the magnitude of decrease in DC current that is to be detected, and control means responsive to first and second output voltages from said comparator means for passing and interrupting, respectively, the energization current.

11. Apparatus according to claim 10 including fifth means operative for providing a first indication and a second indication when the output of said comparator means is the first and second output voltages, respectively; wherein said second means comprises sixth means producing a first DC bias voltage that is adjustable and is connected to a base electrode of said first transistor means for providing a variable control voltage; said apparatus being initially adjustable for operating with respect to a reference level of DC current in active elements in the amplification line by varying the bias voltage for varying the control voltage to make said fifth means change from a first indication to a second indication, and then gradually varying the bias voltage for varying the control voltage in the opposite direction only sufficiently to make the indication produced by said fifth means change from the second indication to the first indication which also causes said comparator means to then provide a second output voltage that causes said third means to decrease the voltage on the collector electrode of said first transistor means a prescribed amount which produces changes in said comparator means input voltages of different values that set a level which the monitored DC current must fall below before the amplification line is replaced by the bypass line in the trunk cable.

12. Apparatus according to claim 11 wherein said resistor means that is common to said first and second transistor means is in the collector circuits thereof.

13. Apparatus according to claim 12 wherein said fourth means comprises a first resistive voltage divider electrically connected between said one side of said power supply and a second node that is electrically connected to said first node and the collector electrode of said first transistor means, and having a tap electrically connected to said second terminal of said comparator means.

14. Apparatus according to claim 13 wherein said first means comprises a current sensing resistor electrically connected in series with active elements of said amplification line and having one side thereof electrically connected to said one terminal of said power supply and passing the DC current powering said active elements, and a second resistive voltage divider electrically connected between the other side of said current sensing resistor and said second node, said second voltage divider having a tap electrically connected to said first input terminal of said comparator means, the resistances of resistors in said first and second voltage dividers and of said current sensing resistor being selected for establishing the percentage of the magnitude of the control voltage that is coupled to the associated input terminal of said comparator means.

15. Apparatus according to claim 14 wherein said third means comprises sixth means electrically connected across said power supply for providing a second DC bias voltage on a terminal thereof that is connected to a base electrode of said second transistor means and third transistor means having an emitter electrode electrically connected to said one side of said power supply, having a base electrode electrically connected to said output terminal of said comparator means, and having a collector electrode electrically connected to said base electrode of said second transistor means for controlling conduction thereof; a second output voltage of said comparator means causing said third transistor means to conduct for clamping said second transistor means base to approximately the supply voltage on said one side of said power supply for cutting off said second transistor means which causes the collector voltage on said first transistor means to be a first value of control voltage; a first output voltage from said comparator means cutting off said third transistor means for enabling condition of said second transistor means and passage of a fixed amount of primary conduction current through said resistor means for causing the collector voltage on said first transistor means and the control voltage to decrease a prescribed amount.

16. Apparatus according to claim 15 wherein said fifth means is a light emitting means that is illuminated for providing a first indication and is shut off for providing a second indication.

17. The method of detecting a differential change in a DC current that exceeds a prescribed value, comprising:

producing a signal voltage Vs proportional to the magnitude of the DC current, coupling a representation of the signal voltage to an input terminal of a voltage comparator having a pair of input terminals and an output terminal, said voltage comparator producing a first output voltage when the input voltage on one input terminal is greater than that on the other input terminal and producing a second output voltage when the input voltage on the other input terminal is greater than that at the one input terminal; and establishing a prescribed value and sense of difference voltage between the input terminals of said voltage comparator for a prescribed DC reference current from which a change in current is to be measured; the prescribed value of difference voltage setting an amount that the representation of the signal voltage (related to the magnitude of DC current) must change in order to cause said voltage comparator to cease producing the first output voltage and to produce the second output voltage and thereby indicate that the change in DC current has exceeded the prescribed limit; said prescribed value of difference voltage being established by increasing the difference voltage between the input terminals of said voltage comparator a prescribed amount in a direction that causes said voltage comparator to continue to operate for producing the first output voltage when the output thereof changes from the second to the first output voltage.

18. The method according to claim 17 wherein said establishing step comprises producing a variable control voltage at a node and coupling representations thereof that are of different values to the input terminals of said comparator means, the difference therebetween (for a DC reference current) being initially set to establish the prescribed value of difference voltage and thus the level of current detection.

19. The method according to claim 20 wherein said establishing step further comprises coupling the output voltage of said voltage comparator to indicating means providing a first indication and a second indication when the output of the comparator means is the first and the second output voltage, respectively, for indicating that the one input terminal voltage is greater than the other input terminal voltage, and vice versa; varying the magnitude of control voltages in one direction, when the DC current is of the reference level, sufficiently to make the indication means produce a second indication when the voltage comparator output is the second output voltage; then gradually varying the control voltage in the opposite direction only sufficiently to make the indication means produce a first indication when the voltage comparator output changes to the first output voltage; and decreasing the control voltage a prescribed amount when the voltage comparator output changes to the first output voltage for producing changes in the input voltages to the voltage comparator that are of different values and that establish the prescribed value of difference voltage there, and thus the level of current detection.

20. Apparatus for detecting a differential change in a DC current that exceeds a prescribed value, comprising:
   comparator means having first and second input terminals and an output terminal, said comparator means producing a first output voltage when the input voltage on the first input terminal is greater than that on the second input terminal and producing a second output voltage when the input voltage on the second input terminal is greater than that on the first input terminal;
   first means producing a signal voltage Vs proportional to the magnitude of the DC current;
   second means operative for coupling a representation of the signal voltage to one input terminal of said comparator means, for initially establishing a difference voltage of a prescribed value and sense between the one and other input terminals of said comparator means for a prescribed DC reference current from which a change in DC current is to be measured;
   the prescribed value of difference voltage setting the amount that the representation of the signal voltage (related to the magnitude of the DC current) must change in order to cause said comparator means to cease producing the first output voltage and to produce the second output voltage and thereby indicate that the change in DC current has exceeded the prescribed limit; said second means producing a control voltage at a first node and coupling representations thereof that are of different values to the input terminals of said comparator means; the difference therebetween, for a DC reference current, establishing the prescribed value of difference voltage and thus the level of current detection.

21. Apparatus according to claim 20 wherein said second means comprises third means for selectively varying the value of the control voltage for establishing operation of said comparator means for a given reference value of DC current.

22. Apparatus according to claim 21 wherein said second means further comprises fourth means responsive to the operation of said comparator means for providing a first indication and a second indication when the output of said comparator means is the first and the second output voltage, respectively, for indicating that the first input terminal voltage is greater than the second input terminal voltage, and vice versa; operation of said comparator means being established for a DC reference current by causing said third means to vary the magnitude of control voltage in one direction, sufficiently to make the output of said comparator means the second output voltage so that said fourth means produces a second indication and then gradually varying the magnitude of the control voltage in the opposite direction only sufficiently to make said fourth means produce a first indication which occurs when said comparator means output changes to the first output voltage, said second means then being responsive to the first output voltage of said comparator means for decreasing the control voltage a prescribed amount which produces changes in the voltages on said comparator means input terminals of different values that establish the prescribed value of difference voltage there and thus the level of current detection.

23. Apparatus according to claim 22 wherein said second means further comprises first transistor means having emitter and collector electrodes electrically connected across a power supply and operative for continuously conducting primary conduction current through a first resistor means, the control voltage being established at a first node associated with one of the emitter and collector electrodes of said first transistor means, and second transistor means that is cut off by a second output voltage of said comparator means and which is responsive to a first output voltage of said comparator means for conducting primary conduction current through a second resistor means, which may be different from said first resistor means, for developing a voltage across it having an affect on the value of control voltage.

24. Apparatus according to claim 23 wherein said first and second resistor means are the same-common resistor means and said first and second transistor means are operative for conducting primary conduction current through said common resistor means, and third means producing a variable DC bias voltage that is applied to a base electrode of said first transistor means for varying the rate of conduction of primary conduction current therethrough and thus the control voltage.

25. Apparatus according to claim 24 wherein said common resistor means is in the collector circuit of said first transistor means and said first node is associated with said first transistor means collector electrode, that is electrically connected to one side of said power supply.

26. Apparatus according to claim 25 wherein said comparator means comprises a voltage comparator having negative and positive input terminals, said second means coupling the representation of the signal voltage to the negative input terminal of said voltage comparator.

27. Apparatus according to claim 26 wherein said first means comprises a current sensing resistor having one side thereof electrically connected to the other side of said power supply and passing the DC current therethrough, said second means further comprising a first resistive voltage divider electrically connected between the other side of said current sensing resistor and a second node that is electrically connected to said first node and the collector electrode of said first transistor means, said first voltage divider having a tap electrically connected to said negative input terminal of said voltage comparator; and a second resistive voltage divider electrically connected between the other side of said power supply and said second node and having a tap electrically connected to said positive input terminal of said voltage comparator.

28. Apparatus according to claim 27 for detecting a decrease in DC current of a prescribed value wherein said negative and positive input terminals of said voltage comparator correspond to the first and second input terminals, the output voltage of said voltage comparator being low when the negative input voltage is greater than the positive input voltage and being high when the negative input voltage is less than the positive input voltage.

29. Apparatus according to claim 27 for detecting an increase in DC current of a prescribed value wherein said negative and positive input terminals correspond to said second and first input terminals, respectively, said comparator means further comprising voltage inverter means electrically connected in series with the output terminal of said voltage comparator, the output voltage of said voltage comparator being low when the negative input voltage is greater than the positive input voltage and being high when the positive input voltage is greater than the negative input voltage, said second transistor means being responsive to the output voltage of said inverter means.

* * * * *